(12) United States Patent
Strongin et al.

(10) Patent No.: US 6,510,497 B1
(45) Date of Patent: Jan. 21, 2003

(54) METHOD AND SYSTEM FOR PAGE-STATE SENSITIVE MEMORY CONTROL AND ACCESS IN DATA PROCESSING SYSTEMS

(75) Inventors: Geoffrey S. Strongin, Austin, TX (US); Qadeer A. Qureshi, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/207,971

(22) Filed: Dec. 9, 1998

(51) Int. Cl.[7] .............................................. G06F 12/00
(52) U.S. Cl. ........................ 711/151; 710/31; 710/33; 710/309; 711/154; 711/167
(58) Field of Search ................... 711/151, 158, 711/105, 137, 15, 127, 147, 150, 154, 159, 148, 149, 167; 710/31, 33, 308, 309

(56) References Cited

U.S. PATENT DOCUMENTS

| | | | |
|---|---|---|---|
| 4,796,232 A | | 1/1989 | House .......................... 365/189 |
| 5,440,713 A | | 8/1995 | Lin et al. ..................... 395/485 |
| 5,509,136 A | | 4/1996 | Korekata et al. ............ 395/478 |
| 5,630,096 A | | 5/1997 | Zuravleff et al. ............ 395/481 |
| 5,664,153 A | * | 9/1997 | Farrell ......................... 711/154 |
| 5,666,494 A | | 9/1997 | Mote, Jr. ..................... 395/481 |
| 5,717,874 A | * | 2/1998 | Ishiwata |
| 5,736,870 A | * | 4/1998 | Greason et al. |
| 5,745,913 A | | 4/1998 | Pattin et al. ................. 711/105 |
| 5,761,706 A | | 6/1998 | Kessler et al. .............. 711/118 |
| 5,784,582 A | | 7/1998 | Hughes ....................... 395/297 |
| 5,860,117 A | | 1/1999 | Cherabuddi ................. 711/151 |
| 5,920,898 A | | 7/1999 | Bolyn et al. ................ 711/167 |
| 5,983,325 A | * | 11/1999 | Lewchuk ..................... 711/105 |
| 6,000,019 A | * | 12/1999 | Dykstal et al. ............. 711/104 |
| 6,026,464 A | | 2/2000 | Cohen .......................... 711/5 |
| 6,035,387 A | * | 3/2000 | Hsu et al. .................... 712/204 |
| 6,047,001 A | * | 4/2000 | Kuo ............................. 711/151 |
| 6,085,291 A | | 7/2000 | Hicks et al. ................. 711/137 |
| 6,092,158 A | * | 7/2000 | Harriman ..................... 711/151 |
| 6,104,417 A | | 8/2000 | Nielsen et al. .............. 345/521 |
| 6,212,612 B1 | * | 4/2001 | Turner ......................... 709/200 |
| 6,226,721 B1 | * | 5/2001 | Strongin et al. ............ 711/158 |
| 6,253,297 B1 | * | 6/2001 | Chauvel et al. ............. 711/154 |
| 6,260,123 B1 | * | 7/2001 | Strongin et al. ............ 711/147 |
| 6,396,729 B1 | * | 2/2002 | Norman et al. ................ 365/63 |
| 6,363,460 B1 | * | 3/2002 | Jeddeloh ..................... 711/105 |

OTHER PUBLICATIONS

Intel Corporation, *Accelerated Graphics Port Interface Specification*, Revision 1.0 (Jul. 31, 1996), pp. ii–x and 1–151.

* cited by examiner

*Primary Examiner*—Matthew Kim
*Assistant Examiner*—Christian P. Chace
(74) *Attorney, Agent, or Firm*—B. Noël Kivlin

(57) ABSTRACT

A method and system which will provide data processing systems having memory controllers with the ability to intelligently schedule accesses to system memory. The method and system provide a memory controller having a page-state sensitive memory arbiter. The method and system further include one or more memory state tracking units operably coupled to the page-state sensitive memory arbiter, and the one or more memory state tracking units operably coupled to a system memory. The one or more memory state tracking units operably coupled to a system memory further include the one or more memory state tracking units operably coupled to one or more system memory devices. The method and system track system memory status, monitor pending memory access requests, and schedule one or more pending memory access requests for execution dependent upon the system memory status and the pending memory access requests.

41 Claims, 8 Drawing Sheets

METHOD AND SYSTEM FOR PAGE-STATE SENSITIVE MEMORY CONTROL AND ACCESS IN DATA PROCESSING SYSTEMS

CROSS-REFERENCE

The present invention is related to subject matter disclosed in the following co-pending applications:

1. U.S. Pat. No. 6,219,769 entitled, "Method And System For Origin-Sensitive Memory Control And Access In Data Processing Systems", naming Geoffrey S. Strongin and Qadeer A. Qureshi as inventors and filed substantially contemporaneously with the present application;
2. U.S. patent application Ser. No. 09/207,970 entitled, "Method And System For Improved Data Access", naming Geoffrey S. Strongin and Qadeer A. Qureshi as inventors and filed substantially contemporaneously with the present application;
3. U.S. Pat. No. 6,226,721 entitled, "Method And System For Generating And Utilizing Speculative Memory Access Requests In Data Processing Systems", naming Geoffrey S. Strongin and Qadeer A. Qureshi as inventors and filed substantially contemporaneously with the present application;
4. U.S. Pat. No. 6,381,683 entitled, "Method And System For Destination-Sensitive Memory Control And Access In Data Processing Systems", naming Geoffrey S. Strongin and Qadeer A. Qureshi as inventors and filed substantially contemporaneously with the present application; and
5. U.S. Pat. No. 6,260,123 entitled, "Method And System For Memory Control And Access In Data Processing Systems", naming Geoffrey S. Strongin and Qadeer A. Qureshi as inventors and filed substantially contemporaneously with the present application.

BACKGROUND OF THE INVENTION

1. Field of the Invention

The present invention relates, in general, to a method and system to be utilized in data processing systems. In particular, the present invention relates to a method and system to be utilized in data processing systems wherein, for non-limiting example, a memory controller is utilized.

2. Description of the Related Art

Data processing systems are systems that manipulate, process, and store data and are notorious within the art. Personal computer systems, and their associated subsystems, constitute well known species of data processing systems. Personal computer systems in general and IBM compatible personal computer systems in particular have attained widespread use for providing computer power to many segments of today's modem society. A personal computer system can usually be defined as a desk top, floor standing, or portable microcomputer that includes a system unit including but not limited to a system processor and associated volatile and non-volatile memory, a display device, a keyboard, one or more diskette drives, one or more fixed disk storage devices, and one or more data buses for communications between devices. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

A computer system or data-processing system typically includes a system bus. Attached to the system bus are various devices that may communicate locally with each other over the system bus. For example, a typical computer system includes a system bus to which a central processing unit (CPU) is attached and over which the CPU communicates directly with a system memory that is also attached to the system bus.

In addition, the computer system may include a peripheral bus for connecting certain highly integrated peripheral components to the CPU. One such peripheral bus is known as the Peripheral Component Interconnect (PCI) bus. Under the PCI bus standard, peripheral components can directly connect to a PCI bus without the need for glue logic. Thus, PCI is designed to provide a bus standard on which high-performance peripheral devices, such as graphics devices and hard disk drives, can be coupled to the CPU, thereby permitting these high-performance peripheral devices to avoid the general access latency and the band-width constraints that would have occurred if these peripheral devices were connected to a low speed peripheral bus. Details on the PCI local bus standard can be obtained under the PCI Bus Specification from the PCI Special Interest Group.

Two relatively high-bandwidth types of traffic that are communicated to and from system memory over the PCI bus are 1394 device traffic and networking traffic. The 1394 device traffic originates within a high speed serial device which communicates with a PCI bus through and over a Southbridge. The networking traffic originates within a network card which is reading network traffic information, regarding one or more networks of which the data processing system is a part, from a network buffer.

Relatively recently, techniques for rendering three-dimensional (3D) continuous-animation graphics have been implemented within PCs which have exposed limitations in the originally high performance of the PCI bus. The AGP interface standard has been developed to both (1) reduce the load on the PCI bus systems, and (2) extend the capabilities of systems to include the ability to provide 3D continuous-animation graphics with a level of quality previously found only on highend computer workstations. The AGP interface standard adds an additional bus to data processing systems: the AGP Interconnect. The AGP interface standard is defined by the following document: Intel Corporation, *Accelerated Graphics Port Interface Specification,* Revision 1.0 (Jul. 31, 1996).

The AGP interface standard reduces the load on PCI bus systems and extends the capabilities of systems to include the ability to provide 3D continuous-animation graphics via a rather indirect process. Under the AGP interface standard, a CPU independently processes the geometric and texturing data (geometric and texturing data are data necessary to properly define an object to be displayed) associated with each object to be displayed in a scene. Subsequent to processing the geometric and texturing data, the CPU writes the geometric and texturing data back into system memory. Thereafter, the CPU informs a graphics processor that the information is ready, and the graphics processor retrieves the information from the system memory.

In current industry architectures, each preceding discussed bus (e.g., the system bus, the AGP interconnect, and the PCI bus) independently articulate with the system memory through a device known as the Northbridge. The various communications with, or accesses of, system memory are generally controlled by a device within the Northbridge know as a "memory controller".

A memory controller controls system memory which is typically a collection of Direct Random Access Memory chips (DRAMs). The computer system memory, composed of DRAMs, can store data, but there is conventionally no intelligence in the system memory. The intelligence concerning how data is going to be stored, where the data is going to be stored, how the data is going to be read or written, etc., is provided by the "memory controller".

The memory controller controls access to system memory, which as has been noted is typically composed of DRAMs. A DRAM can be thought of as a collection of cells, or storage locations, wherein data is stored. For simplicity it will be assumed here that each cell stores a byte, but those skilled in the art will recognize that other storage sizes are possible.

When a memory access, such as a read cycle, is engaged in, the memory controller is given an address by another device, such as a graphics controller. That address needs to correctly specify one of the cells where data is actually stored. Ordinarily, cells within DRAMs are arranged in row and column format (i.e., the cells are arranged like a matrix).

Consequently, an address, which for sake of illustration will be assumed to be 16 bits long, customarily is conceived of as being composed of two parts: a first 8-bit portion of the address which is associated with a row address, and a second 8-bit portion which is associated with a column address (again, the bit lengths are hypothetical and merely utilized here for illustrative purposes). This fragmentation of the address into row and column portions allows the address to correctly specify a storage location, or cell, by its row and column.

Conventionally, a DRAM has at least two buses, or at least hypothetically what can be treated as two buses: a data bus, and an address bus. To minimize DRAM hardware, it is customary that the address bus be only eight bits wide, in order to minimize the number of pins on the DRAM, which those skilled in the art will recognize is a major constraint or limiting factor on how small one can make a DRAM chip. Due to this limitation on the width of the address bus, memory access is typically achieved by first placing the row portion of the address on the address bus, which will select the appropriate row, and second, a short time later, placing the column portion of the address on the address bus, which will select the appropriate column. This then correctly specifies the row and column location of the storage location that is desired. At some time after the row and column information have both been specified, the data from the memory location specified by the row and column address appears on the DRAM data bus.

From the foregoing, it can be seen that in order to make a single memory access there are three phases: a row address phase, a column address phase, and a data retrieval phase. In the past, it was noticed that typical programs tend to operate sequentially, so if there is a memory address accessed, it is likely that the next memory address accessed will be the very next cell, which means that the column address is likely to change, while the row address is not likely to change. Consequently, typical DRAMs are structured such that once the row address has been driven, thereafter the DRAM responds to new addresses on the address bus as if those addresses are column indicators, and thus will use such addresses as column addresses within a current row until the DRAM is notified that a new row address will be appearing on the address bus, or the extent of the columns within the row is exceeded and a page fault occurs. DRAM devices using this scheme (driving the row once and then operating upon columns within the row) are known in the art as "page mode" DRAMs.

In light of the foregoing, in the event that a memory controller has several memory accesses to be done sequentially, then once a page is open it would make sense (but it is not currently done in the art) from an efficiency standpoint to examine pending as well as current memory accesses in order to determine which of those pending memory accesses will be to memory locations that are within a currently open page (that is, the row of the request is the row from which a memory controller is currently reading within a DRAM). In other words, assuming a page X is open, if there are four memory accesses A, B, C, and D, waiting to be performed, and assuming the first access A is to page Z, the second access B is to page X, the third access C is to page Y, and the fourth access D is to page W, it is preferable from a memory efficiency standpoint that the data access (i.e., access B) appropriate to the page that is open (i.e., page X) be made first.

Current memory controllers do not typically "look ahead" to see if certain pending memory accesses are destined for currently open pages. Furthermore, at any given time, typically more than one page of memory is generally open and in future systems this will become more likely. For example, under the Direct RDRAM scheme (not currently available, but expected to be available in the near future), it is expected that up to 8 pages per RDRAM chip will be open simultaneously. Thus, if a system has eight RDRAM chips (a reasonable assumption), it will be possible to have up to 64 pages open simultaneously.

Controlling memory access via the use of "look ahead" would be undeniably valuable. Furthermore, as the foregoing has shown, the prospective ability the memory controllers to schedule memory access on the basis of look ahead is likely to become even more important in that future system memories are likely to be able to provide a very large number of open pages of memory simultaneously. It is therefore apparent that a need exists in the art for a method and system which will provide data processing systems, having memory controllers, with the ability to look ahead and intelligently schedule accesses to system memory utilizing information gained from such looking ahead.

In addition to the foregoing, it has been noted that multiple devices (e.g., one or more CPUs, PCI bus devices, 1394 devices, and network devices) communicate over various different buses in order to access data processing system memory through a memory controller. Different types of devices have different types of memory access needs as do different data buses. At present, current data processing system memory controllers do not recognize and/or utilize the differing memory access requirements of the various devices, or the different access requirements of the buses over which they communicate, in order to efficiently schedule data processing system memory access. It is therefore apparent that a need exists for a method and system which will provide data processing systems, having memory controllers, with the ability to recognize and take advantage of the varying needs of differing devices and/or the needs of the various data buses through which such devices communicate with data processing system memory.

SUMMARY OF THE INVENTION

It has been discovered that a method and system can be produced which will rovide data processing systems having memory controllers with the ability to intelligently schedule accesses to system memory. In one embodiment, the method and system a memory controller having a page-state sensitive memory arbiter. In another embodiment, the method and system further include one or more memory state tracking units operably coupled to the page-state sensitive memory arbiter, and the one or more memory state tracking units operably coupled to a system memory. In another embodiment, the one or more memory state tracking units operably coupled to a system memory further include the one or more memory state tracking units operably coupled to one or more system memory devices. In another embodiment, the method and system track system memory status, monitor pending memory access requests, and schedule one or more pending memory access requests for execution dependent upon the system memory status and the pending memory access requests.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention as described in the claims. The detailed description is intended to be illustrative and should not be taken as limiting.

I. Environment for Methods and Systems

Figure 1:
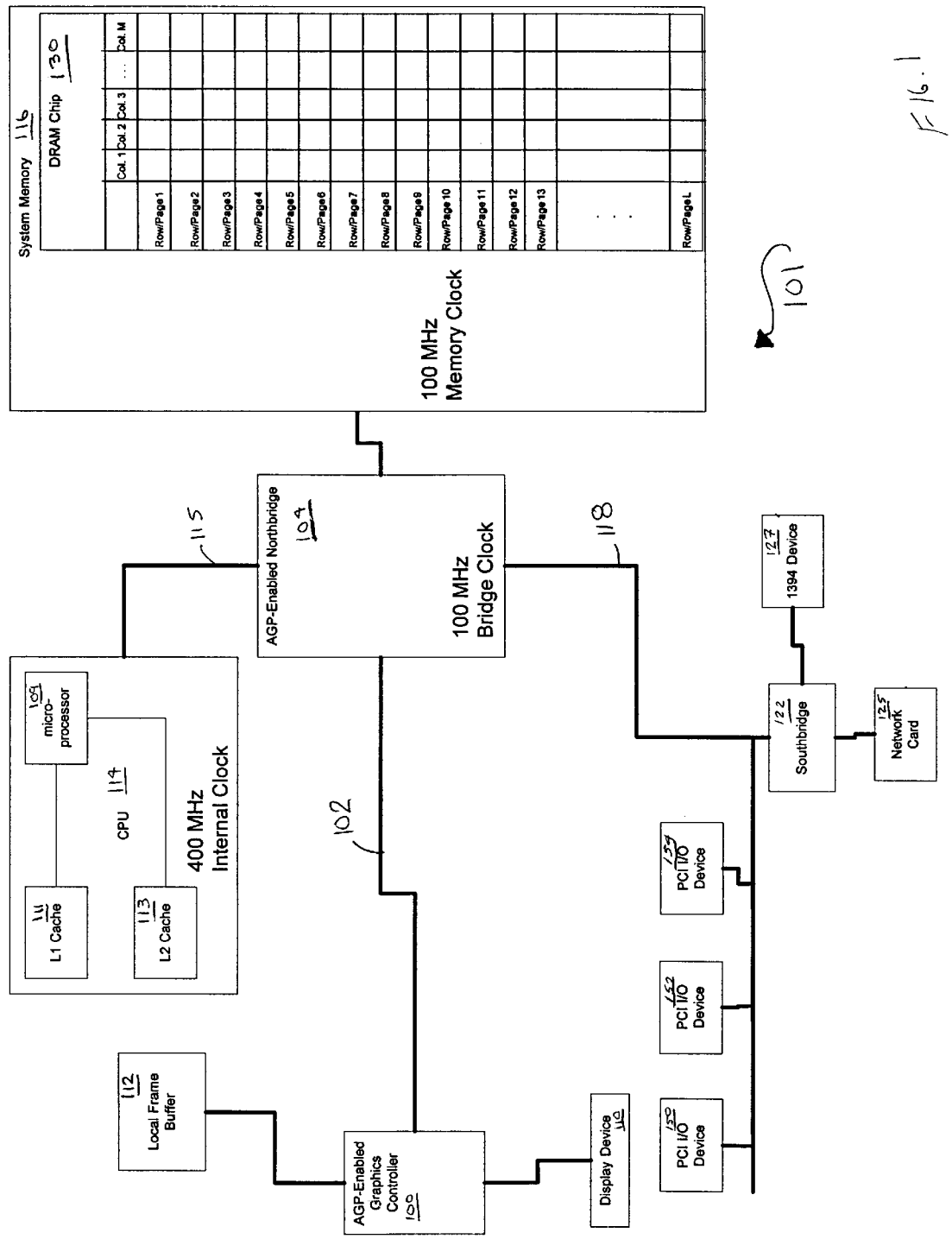
FIG. 1 shows a high-level component diagram depicting a related art AGP-enabled data processing system which forms an environment wherein one or more embodiments of the present invention may be practiced.

Referring now to FIG. 1, shown is a high-level component diagram depicting an AGP-enabled data processing system 101 which forms an environment wherein one or more embodiments of the present invention may be practiced. Shown are AGP-enabled graphics controller 100, AGP interconnect 102 (a data bus), and AGP-enabled Northbridge 104. Not shown, but deemed present is an AGP-enabled operating system. The term AGP-enabled is intended to mean that the so-referenced components are engineered such that they interface and function under the standards defined within the AGP interface specification, referenced above. Further depicted are display device 110, local frame buffer 112, Central Processing Unit (CPU) 114 (wherein are depicted microprocessor 109, L1 Cache 111, and L2 Cache 113), CPU bus 115, system memory 116, Peripheral Component Interconnect (PCI) bus 118, various PCI Input-Output (I/O) devices 150, 152, and 154, Southbridge 122, 1394 Device 125, and network card 127.

The foregoing components and devices are used herein as examples for sake of conceptual clarity. As for (non-exclusive) examples, CPU 114 is utilized as an exemplar of any general processing unit, including but not limited to multiprocessor units; CPU bus 115 is utilized as an exemplar of any processing bus, including but not limited to multiprocessor buses; PCI bus 118 is utilized as an exemplar of any input-output device attached to an I/O bus; AGP Interconnect 102 is utilized as an exemplar of any graphics bus. AGP-enabled graphics controller 100 is utilized as an exemplar of any graphics controller; Northbridge 104 and Southbridge 122 are utilized as exemplars of any type of bridge; 1394 device 125 is utilized as an exemplar of any type of isochronous source; and network card 127, even though the term "network" is used, is intended to serve as an exemplar of any type of synchronous or asynchronous input-output cards. Consequently, as used herein these specific exemplars are intended to be representative of their more general classes. Furthermore, in general, use of any specific exemplar herein is also intended to be representative of its class and the non-inclusion of such specific devices in the foregoing list should not be taken as indicating that limitation is desired.

Generally, each bus utilizes an independent set of protocols (or rules) to conduct data (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the function of AGP-enabled Northbridge 104, in that it is to be understood that it translates and coordinates between the various data buses which communicate through AGP-enabled Northbridge 104.

Notwithstanding the issue of differing bus protocols, further illustrated in FIG. 1 is that various system components operate off of various internal clocks, where each internal clock can vary from others present. Regarding the non-limiting exemplary clock speeds shown, it will be understood by those within the art that, typically, CPU 114 multiplies a bus clock (an external clock, not shown) in order to generate an internal clock that is faster (e.g., twice, three time, four times, etc.) than the bus clock. In contrast, AGP-enabled Northbridge 104 and system memory 116 typically (but not always) use the bus clock as their respective internal clocks without multiplying the bus clock. Specifically, shown is that CPU 114 operates off an internal clock whose speed is illustrated at 400 MHz, AGP-enabled Northbridge 104 operates off an internal bridge clock whose speed is illustrated at 100 MHz, and system memory 116 operates off an internal memory clock whose speed is illustrated at 100 MHz. Those skilled in the art will recognize that these clock speeds are nonlimiting, exemplary only and can vary widely, and that each described component can have a clock speed varying from each of the other described components.

Those skilled in the art will recognize that microprocessor 109 sends a request to memory only when the data it is seeking to access is not resident in either L1 cache 111 or L2 cache 113. That is, processor 109 only seeks to read from system memory 116 when a miss occurs with respect to microprocessor's 109 L1 cache 111 or L2 cache 113. One problem that arises when processor 109 must access system memory 116 is that while the processor is running at an internal speed of 400 MHz, AGP-enabled Northbridge 104 and system memory 116 are only running at 100 MHz, so when processor 109 has to access system memory 116, the internal clock speeds of AGP-enabled Northbridge 109 and system memory 116 become the factors ultimately controlling the speed of system memory 116 access. Thus, when microprocessor 109 has to go outside CPU 114 to access data, the speed of access becomes controlled by the 100 MHz bridge and memory clocks. Those skilled in the art will recognize that typically AGP-enabled Northbridge 104 may require up to two bridge clock cycles to determine what to do with a specific memory request from processor 109. Notice that in the example shown this translates into 8 CPU 114 internal clock cycles in that the CPU 114 internal clock is running 4 times faster than the bridge clock.

Once AGP-enabled Northbridge 104 has determined that it has received a request from processor 109 to access system memory 116, AGP-enabled Northbridge 104 thereafter sends the request to system memory 116. Upon receipt of the request, system memory 116 has to drive the address on a DRAM chip 130 address bus, and DRAM chip 130 has to decode the address, access the location, and drive the data back to AGP-enabled Northbridge 104 which thereafter drives the data back to microprocessor 109. Those skilled in the art will recognize that the foregoing operations generally require anywhere from 5 to 15 bridge/memory clock cycles (bridge and memory clocks are shown as running at the same speed in FIG. 1, but those skilled in the art will recognize that this is not necessarily the case) between processor 109 requesting data from system memory 116, and processor 109 receiving the data in response to its request. The foregoing noted clock cycles translate into a very substantial latency from the standpoint of processor 109 (e.g., 20–60 CPU 114 internal clock cycles). Consequently, CPU 114 often spends a significant amount of time waiting for system memory 116 to respond to a request for data. Furthermore, it is significant that the foregoing described example was based on an assumption that DRAM 130 in system memory 116 was in a state in which it could service a request, and those skilled in the art will recognize that if DRAM 130 had not been in a state wherein it could service a request (e.g., a page in DRAM 130 had been closed or had been in a transitional "refresh" state), the foregoing described latency could have been much, much greater than that illustrated.

Those skilled in the art will recognize that another problem, in addition to the foregoing described problem of latency, is that typically a memory request on CPU bus 115 tends to function as a blocking cycle, so data processing system 101 tends to come to a halt while processor 109 is waiting to access system memory 116. Thus, the foregoing has demonstrated via non-exclusive examples that main memory latency is one of the most significant issues limiting the performance of current data processing systems.

In addition to the foregoing, newer systems have AGP subsystems which can put a significant amount of extra loading on system memory 116. Under the current specification, AGP-enabled devices can put up to 1 Gbyte per second of load on system memory 116. Thus, in systems where AGP-devices are present (such as data processing system 101), when a memory controller (not shown) is servicing AGP requests, it is apparent that the foregoing described latencies will tend to go even higher. In addition, PCI bus 118 also adds yet more loading onto system memory 116. Thus, in the presence of AGP devices and PCI devices, system memory 116 latency becomes even more of an issue than that previously described, which as can be seen was actually effectively a "best case" (or least latency) scenario.

It has been discovered that significant reductions in main memory latency can be achieved by taking advantage of correlations internal to multiple independent streams of memory accesses. As used herein, the term "correlation" means that different addresses corresponding to different accesses tend to fall within a relatively narrow range. For non-limiting example, when AGP-enabled graphics controller 100 accesses system memory 116, such accessing tends to be highly correlated in that the memory locations accessed tend to be in closely situated addresses. The present invention, among other things, allows correlations present to be taken advantage of in order to reduce memory latency.

Figure 2:
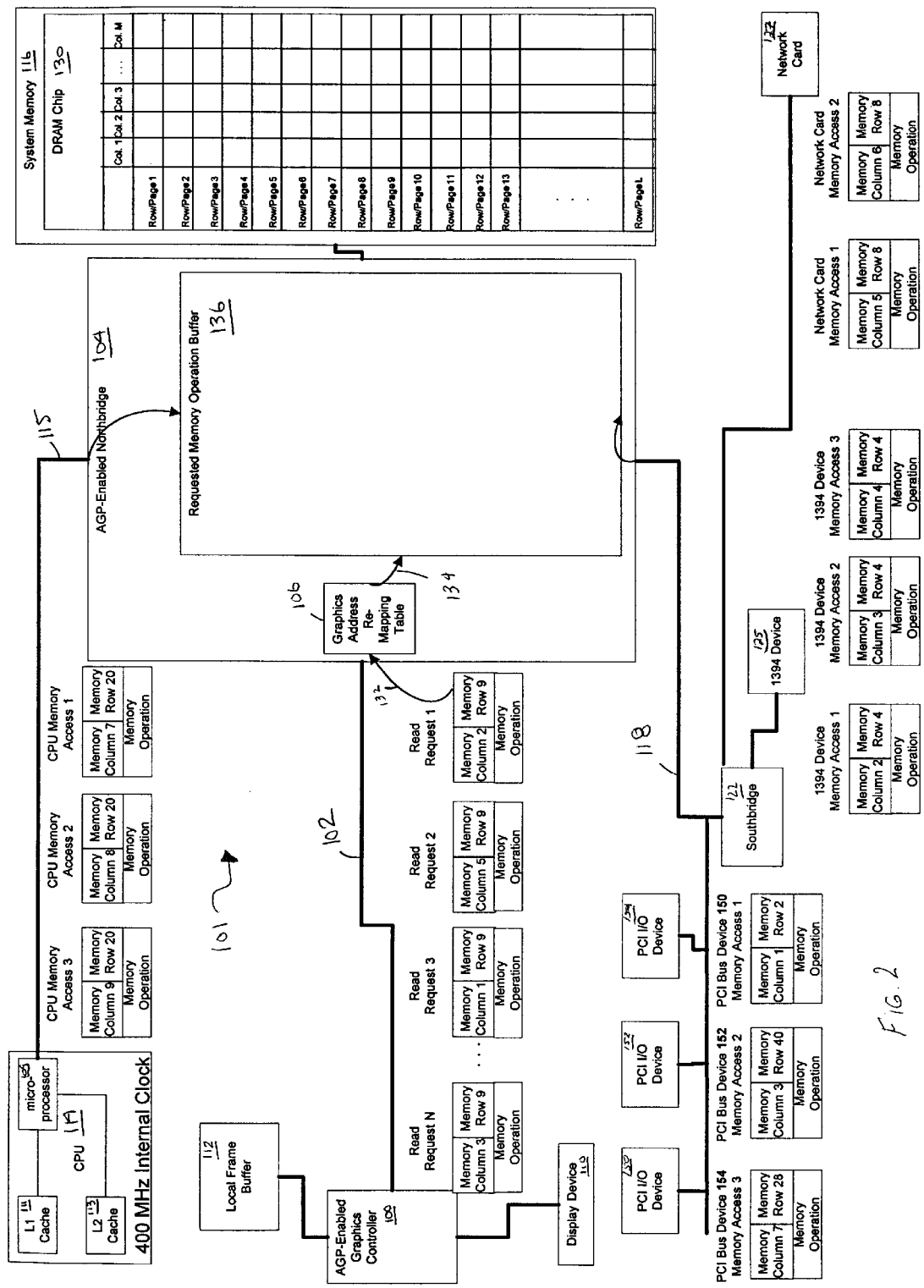
FIG. 2 depicts a high-level block diagram illustrating in broad overview how data requests may arise within the AGP-enabled system of FIG. 1, which forms an environment wherein one or more embodiments of the present invention may be practiced.

Referring now to FIG. 2, shown is a high-level block diagram illustrating in broad overview how data requests may arise within AGP-enabled system 101 of FIG. 1, which forms an environment wherein one or more embodiments of the present invention may be practiced. The components shown function substantially similar to the like-numbered components described in relation to FIG. 1.

Those skilled in the art will recognize that under the AGP interface standard a graphics controller is free to issue pipelined requests for data. Shown is that AGP-enabled graphics controller issues N (where N is some positive integer) read requests to read data from a particular cell, or row and column location, from DRAM chip 130 in system memory 116 prior to any of the N−1 outstanding read requests being answered. It should be noted that although for conceptual clarity the read requests are shown in FIG. 1 as labeled requests 1 through N, under the AGP standard there is no such labeling, and under the AGP standard such ordering is merely denoted by transmission order of the requests. Further illustrated is that within DRAM chip 130 each row can be conceptualized as a "page" in memory.

Those skilled in the art will recognize that the AGP interface standard allows AGP-enabled devices to treat AGP memory as if it were one contiguous whole, while in point of fact it may consist of several discontiguous regions of system memory. Accordingly, under the AGP-interface standard read requests to system memory first transit 132, 134 Graphics Address Re-mapping Table (GART) 106 prior to being loaded into requested memory operation buffer 136. Ordinarily, GART 106 re-maps the row and column AGP-memory addresses for which accesses are requested into row and column physical memory addresses. However, for sake of clarity of presentation and understanding, herein GART 106 will be treated as if it is transparent to the process. That is, while those skilled in the art will recognize that GART 106 will typically re-map requested addresses, in the present detailed description GART 106 will be treated as if it merely passes the addresses through without re-mapping them so that the embodiments discussed herein can be more clearly understood.

Those skilled in the art will recognize that under some CPU bus protocols, CPU 114 is free to issue pipelined memory accesses. Shown is that CPU 114 issues 3 memory accesses, each of which is to a particular cell, or row and column location, within DRAM chip 130 in system memory 116 prior to any of the 2 outstanding memory accesses being performed. It should be noted that although for conceptual clarity the read requests are shown in FIG. 1 as labeled requests 1 through 3, under the CPU bus standards there is no such labeling, and under the CPU bus standards such ordering is merely denoted by transmission order of responses to the requested accesses.

Depicted are three PCI bus devices 150–154 which are shown to have placed 3 separate memory access requests on PCI bus 118. It will be understood by those within the art that ordinarily only one such PCI bus device memory access may be resident on PCI bus 118 at any particular time. Consequently, it will be understood by those within the art that the depicted 3 PCI bus 118 memory access requests are illustrative of the three requests occurring at three distinct different instances in time.

Historically, any PCI bus device requesting memory access via PCI bus 118 had to wait for the requested memory access to be completed prior to relinquishing PCI bus 118. This was found to result in inefficiency due to PCI bus 118 being monopolized by any such PCI bus device waiting for an access to complete. It has been found that a way around the monopolization problem is to terminate each PCI request to access memory without waiting for the data to be manipulated by the request to travel all the way from/to memory (i.e., without waiting for the cycle to complete). For example, it is conceivable to have multiple PCI requests outstanding within AGP-enabled Northbridge 104 by mandating that AGP-enabled Northbridge 104, in response to a request for memory access from PCI bus device 150–154, direct the PCI master to retry, which will result in the PCI master releasing the bus thus freeing PCI bus 118 so that other PCI masters can issue requests. Any subsequently retried accesses will often be completed quickly because AGP-enabled Northbridge 104 will typically have the data ready when the request is retried. Thus, the foregoing schemes demonstrate that there could be multiple memory transactions pending within AGP-enabled Northbridge 104 from various PCI devices at any given time, even though PCI bus 118 can ostensibly support only one transaction at a given time.

Likewise with the five remaining accesses depicted. Although depicted are three 1394 device 125 memory access requests, it will be understood by those within the art that ordinarily only one such memory access may be resident on PCI bus 118 at any particular time. In like fashion, although depicted are two network card 127 memory access requests, it will be understood by those within the art that ordinarily only one such memory access may be resident on PCI bus 118 at any particular time. Consequently, it will be understood by those within the art that the depicted five remaining memory access requests are illustrative of the five requests occurring at five distinct instances in time. Lastly, illustrated is that 1394 device 125 requests and network card 127 requests travel to and from AGP-enabled Northbridge 104 by and through Southbridge 122 in conjunction with PCI bus 118.

Figure 3:
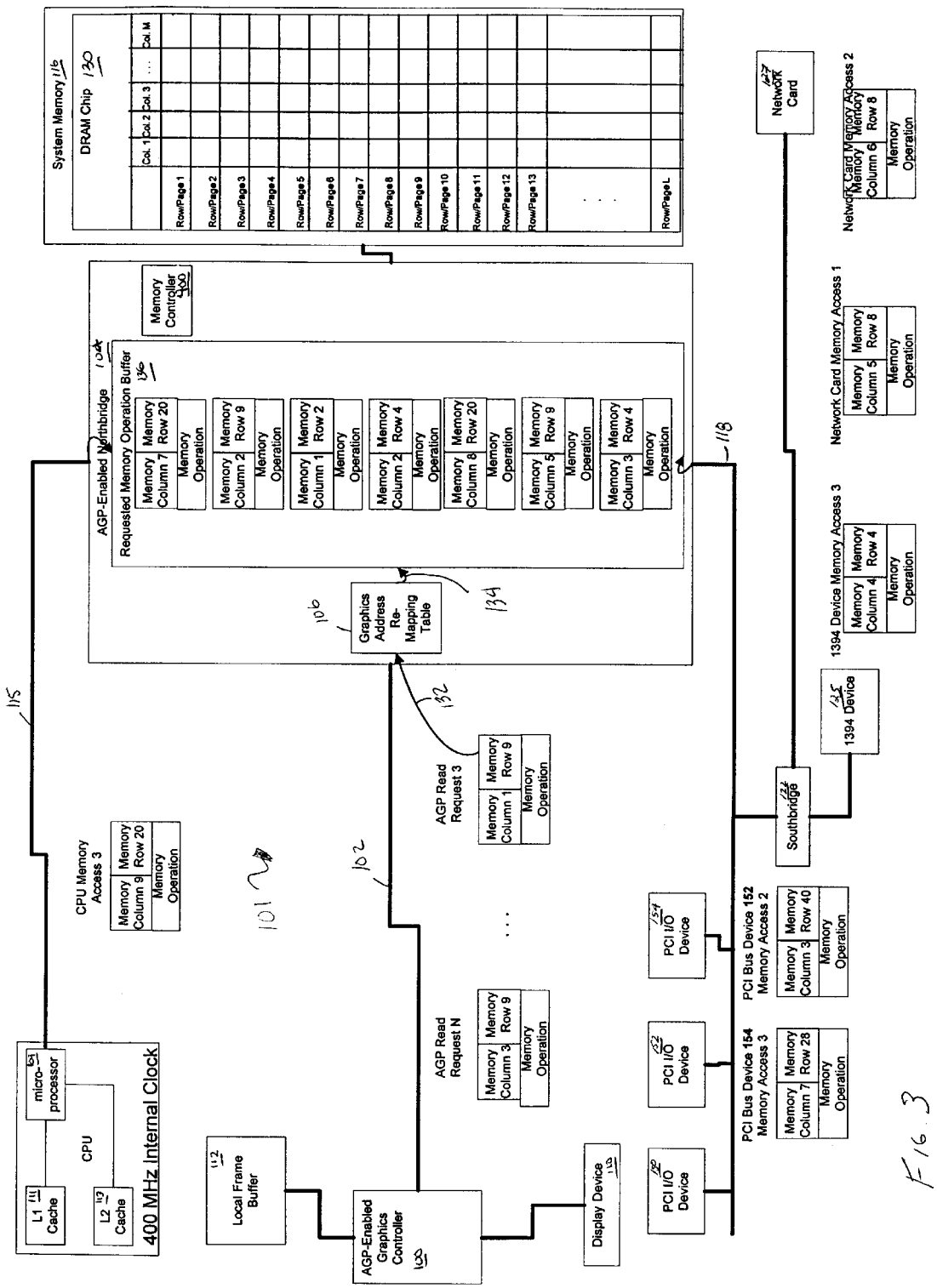
FIG. 3 illustrates a high-level block diagram showing in broad overview how the AGP-enabled system of FIG. 1, which forms an environment wherein one or more embodiments of the present invention may be practiced, accesses memory and manipulates data within the memory locations specified by the memory access requests illustrated in FIG. 2.

Referring now to FIG. 3, shown is a high-level block diagram illustrating in broad overview how the AGP-enabled system 101 of FIG. 1, which forms an environment wherein one or more embodiments of the present invention may be practiced, accesses memory and manipulates data within the memory locations specified by the memory access requests illustrated in FIG. 2. Shown are AGP-enabled graphics controller 100, AGP interconnect 102 (a data bus), and AGP-enabled Northbridge 104. The remaining shown components function substantially similar to the like-numbered components described in relation to FIGS. 1 and 2.

As has been shown in relation to FIG. 2, in a typical data processing system multiple devices are often vying for access to system memory, a fact illustrated in FIG. 2 by the fact that various and different requests to access system memory are simultaneously present on CPU bus 115, AGP interconnect 102, and PCI bus 118. Those skilled in the art will recognize that there are a myriad of ways in which the various requests vying for system memory access can be serviced. For sake of illustration, depicted in FIG. 3 is that the requests are serviced in counter-clockwise "round-robin" fashion, starting with the requests on CPU bus 115. That is, depicted in FIG. 3 is that CPU memory access 1 is the first requested memory operation loaded into requested memory operation buffer 136; thereafter, in accordance with a counterclockwise round robin scheme, appear within requested memory operation buffer 136 AGP read request 1, PCI I/O device 150 request, 1394 device memory access 1, CPU memory access 2, AGP read request 2, and 1394 device memory access 2. The order in which the requests appear in requested memory operation buffer 136 is consistent with the round-robin scheme, with the understanding that 1394 device memory access 2 appears on PCI bus 118 before PCI Bus device memory access 2, and thus that is why 1394 device memory access 2 is shown as loaded in requested memory operation buffer 136.

With the requested memory operations so loaded, memory controller 400 can thereafter service the requests in requested memory operation buffer 136 in the fashion dictated by the system. Various ways of servicing such requests are set forth below in the various following embodiments.

II. Page-State Sensitive Memory Access and Control

Although the following embodiments are described via the use of "page-state" terms, it is to be understood that the term "page-state" is exemplary. It will be understood by those within the art that as used herein the term "page-state" is a specific instance of a way in which the availability of memory storage can be tracked, and it is intended that such term be understood to equate to all substantially equivalent memory device storage state referents which are used to demarcate the state of various aspects of system memory, such as "bank state".

It has been discovered that the efficiency of memory controller 400 can be enhanced by empowering memory controller 400 such that memory controller 400 can reorder memory transactions to substantially maximize memory efficiency. This approach can, among other things, increase the page-hit rate, thus improving the memory subsystem performance. In one embodiment, memory controller 400 may reorder transactions such that accesses to currently open pages are completed ahead of transactions that are targeted to pages not currently open.

Figure 4:
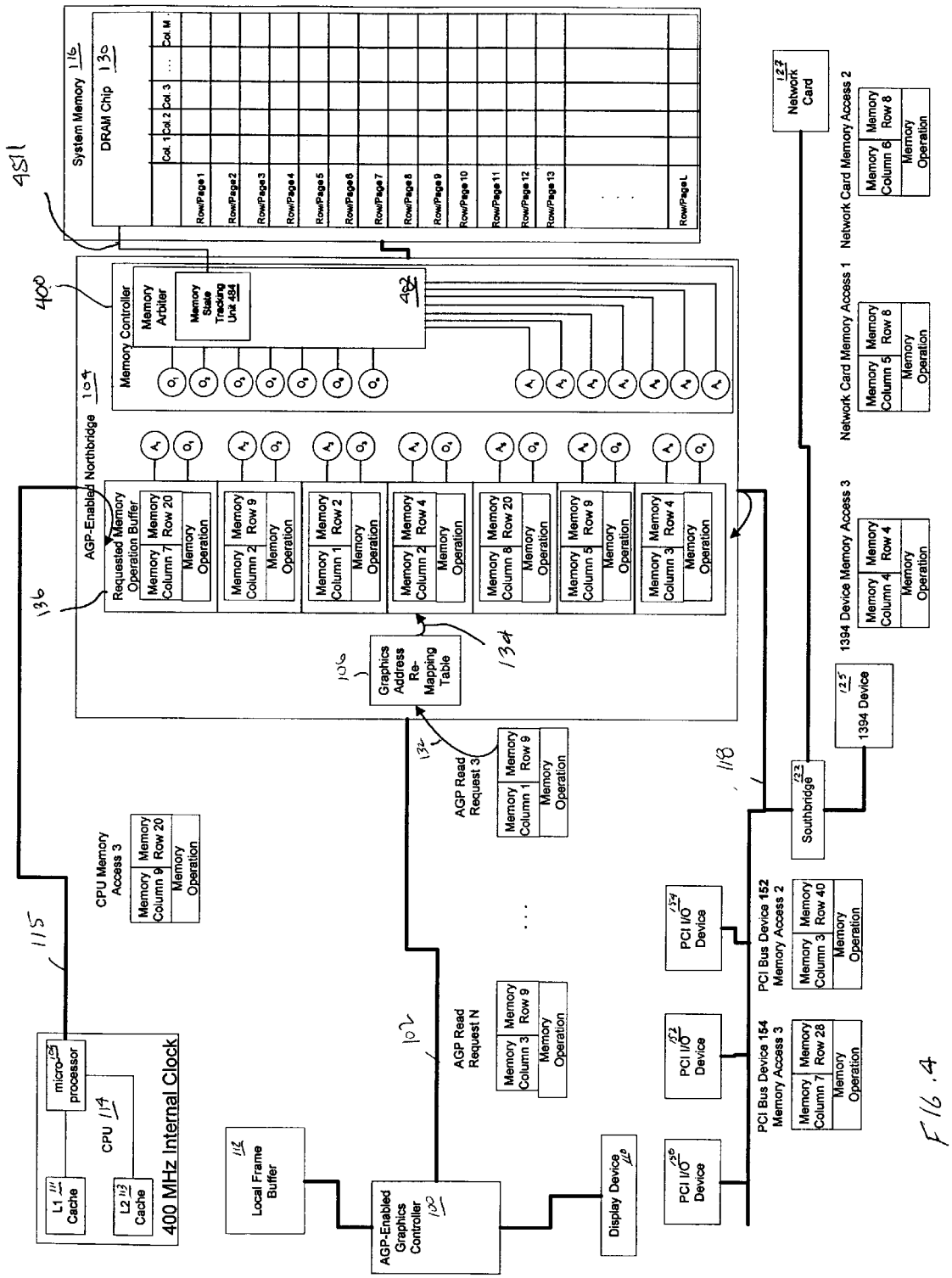
FIG. 4 shows a high-level pictographic representation of an embodiment of the present invention.

With reference now to FIG. 4, shown is a high level pictographic representation of an embodiment of the present invention. Illustrated is that associated with requested memory operation buffer 136 are memory address location lines $A_1$ through $A_n$. Further associated with requested memory operation buffer 136 are memory operation lines $O_1$ through $O_n$. (The letter "n" is utilized to indicate the upper limit of storage locations available in requested memory operation buffer 136, where such storage locations are envisioned to be numbered from 1 to n, where n is some positive integer.)

Shown is that memory address location lines $A_1$ through $A_n$ are received by memory arbiter 482 contained within memory controller 400. This arrangement allows memory arbiter 482 to have knowledge of the memory locations to be accessed by substantially all currently pending memory operations present within requested memory operation buffer 136.

Further shown is that memory operation lines $O_1$ through $O_n$ are also accepted by memory arbiter 482. Memory operation lines $O_1$ through $O_n$ convey information related to whether a respective memory operation is either a read, or write, or other operation. Consequently, memory address location lines $A_1$ through $A_n$ respectively associated with, or paired, with respective memory operation lines $O_1$ through $O_n$ illustrate that memory arbiter 482 has knowledge of both the address to be accessed by specific pending memory operations contained within requested memory operation buffer 136 as well as the type of operation to be performed upon the data contained within the respective memory addresses to be accessed by the pending memory operation requests.

Depicted is that memory state tracking unit 484 receives information via memory status information line[1] 4511 about the state of system memory 116, such as information about the state of open pages. Such information may include, among other things, the identity of pages actually open within DRAM chip 130, the last accessed position within the open pages of DRAM chip 130, the direction in which the bus associated with DRAM chip 130 is pointed (i.e., whether the bus is pointed toward system memory 116 versus being pointed toward memory arbiter 482).

[1] While embodiments set forth herein describe memory arbiters (e.g., 482) and/or components thereof (e.g. memory state tracking units 484; 486; 4821–482D) acquiring memory status via memory status lines (e.g., 4511; 4521–452D), it is to be understood that for each such described embodiment, corresponding alternate embodiments acquire memory status without such memory status lines. In such alternate embodiments, the memory arbiters and/or components thereof are operably connected to one or more memory devices (e.g., DRAM chips 1301–130D) not physically but by logical association whereby memory status is determined based on previous memory access activity (e.g., previous memory requests issued and/or elapsed time since requests issued can be used to determine/acquire the status of the one or more system memory devices).

From the foregoing it can be seen that memory arbiter 482 can be aware, for example, of the open pages in system memory 116, the direction in which the bus associated with DRAM chip 130 is pointed, the addresses to be accessed by pending memory operations in requested memory operation buffer 136, and the types of operations to be performed by those pending memory operations present in requested memory operation buffer 136.

In one embodiment, memory arbiter 482 examines the information cited (e.g., addresses to be accessed by pending memory operations, the type of memory operation to be performed, the state of system memory 116 (specifically the pages open within DRAM chip 130 and the direction of the buses associated with those respective open pages)) to determine which pending memory operation(s) should be next executed.

In one embodiment, the pending memory operations are scheduled for execution in the following hierarchy: first, those non-speculative memory operations directed to open pages and of a type consistent with the direction of any data bus associated with those open pages (e.g., a write operation would be scheduled for execution if a bus were pointed from memory arbiter 482 to an open page in system memory 116 to which the write operation indicates data is to be written) are scheduled for execution (and, optionally, following the selection, thereafter reordered on the basis of the relative priorities of the requests selected for execution). Second scheduled for execution are those pending non-speculative memory operations within requested memory operation buffer 136 which are directed toward open pages, but which are of a type which would require that the bus associated with the open pages be reversed in direction (again such requests can be optionally rearranged following selection depending upon any associated priorities). Third scheduled for execution are those non-speculative operations directed toward pages which are not currently open in system memory, but which are consistent with the direction of a bus associated with the target pages (again, optional reordering may be done). Fourth scheduled are those non-speculative requests directed to closed pages and which are inconsistent with the direction of a bus associated with the target pages (again, optional reordering may be done). Fifth scheduled are those non-speculative operations directed to pages in a refresh state (again, optional reordering may be done). Last scheduled are speculative operations or accesses. Other embodiments for hierarchical reordering within the spirit of the foregoing also exist, such as reordering of the foregoing described scheme or a subset thereof, or the foregoing hierarchy analogously reengaged in for scheduling the speculative operations or accesses.

Those skilled in the art will recognize that the foregoing described scheme will reduce memory latency in that one of the largest factors associated with memory latency is that associated with closing a currently open page and opening a currently closed page. Furthermore, those skilled in the art will also recognize such memory latency can increase significantly if the page to be opened is a page currently in a "refresh" state. Thus, the embodiment shown should significantly decrease memory latency and increase the performance of data processing systems.

Figure 5:
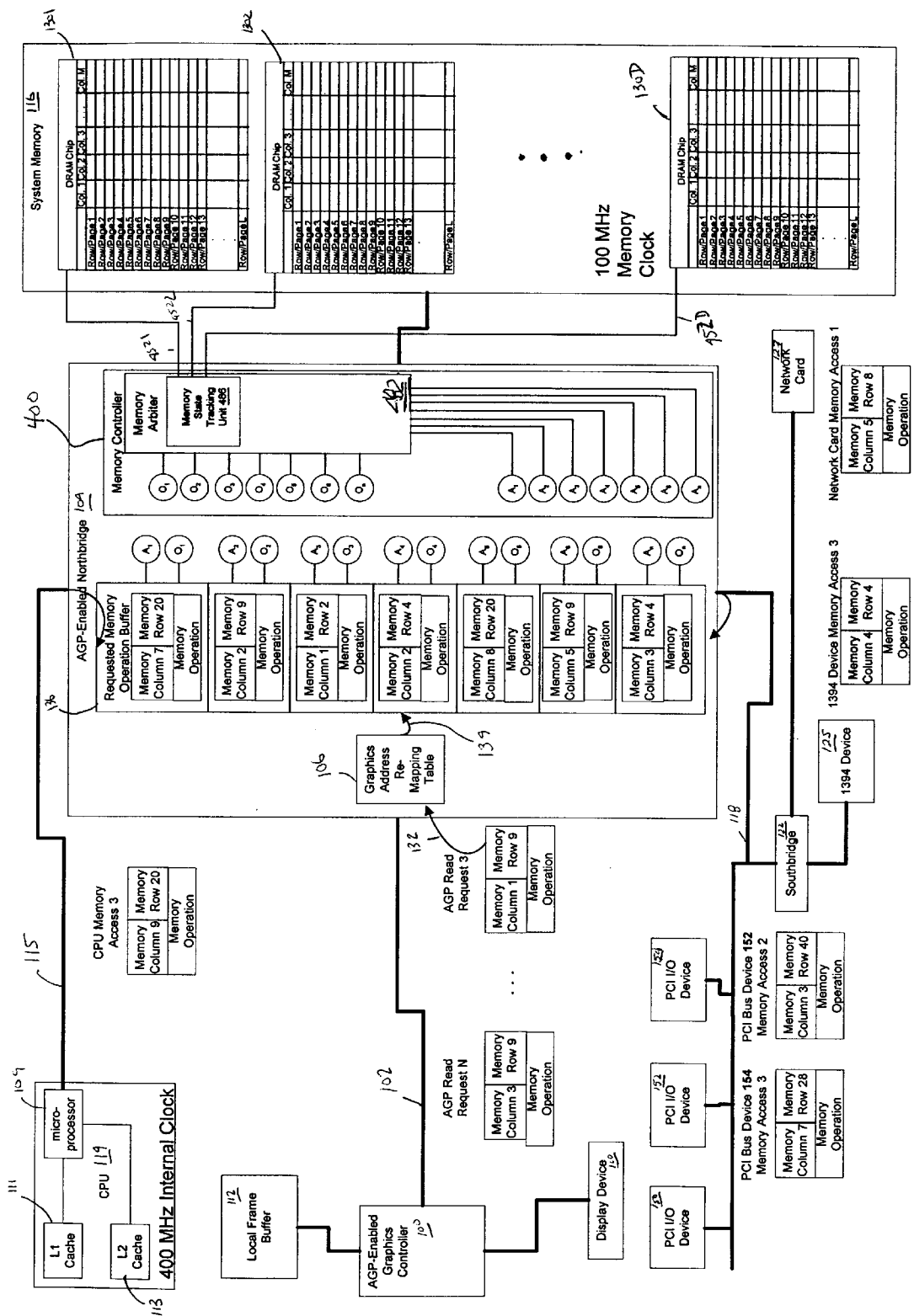
FIG. 5 shows a high-level pictographic representation of an embodiment of the present invention.

Referring now to FIG. 5, depicted is a high level pictographic representation of an embodiment of the present invention. The embodiment shown in FIG. 5 is substantially similar to that shown in FIG. 4. However, notice that system memory 116 now contains multiple DRAM chips 1301–130D, rather than just one DRAM chip. Shown is that memory state tracking unit 486 accepts system memory 116 status information over memory status lines 4521–452D. Memory arbiter 482 can then utilize the system memory 116 status information, in conjunction with the address and operation information of the pending memory operation transactions in requested memory operation buffer 136 in order to schedule pending memory operations for execution.

This scheduling can be based upon a combination of the information available memory arbitrary 482. For example, the scheduling could be based upon the bus directions and their associated open pages of the multiple DRAM chips 130I–130D in conjunction with the type of memory operations in requested memory operation 136 to be performed. Those skilled in the art will also recognize that the described embodiment could also have, in the place of DRAM chips 130I–130D, banks of memory and that the principle operation in such an embodiment would be substantially the same as that described in relation to FIG. 5.

Figure 6:
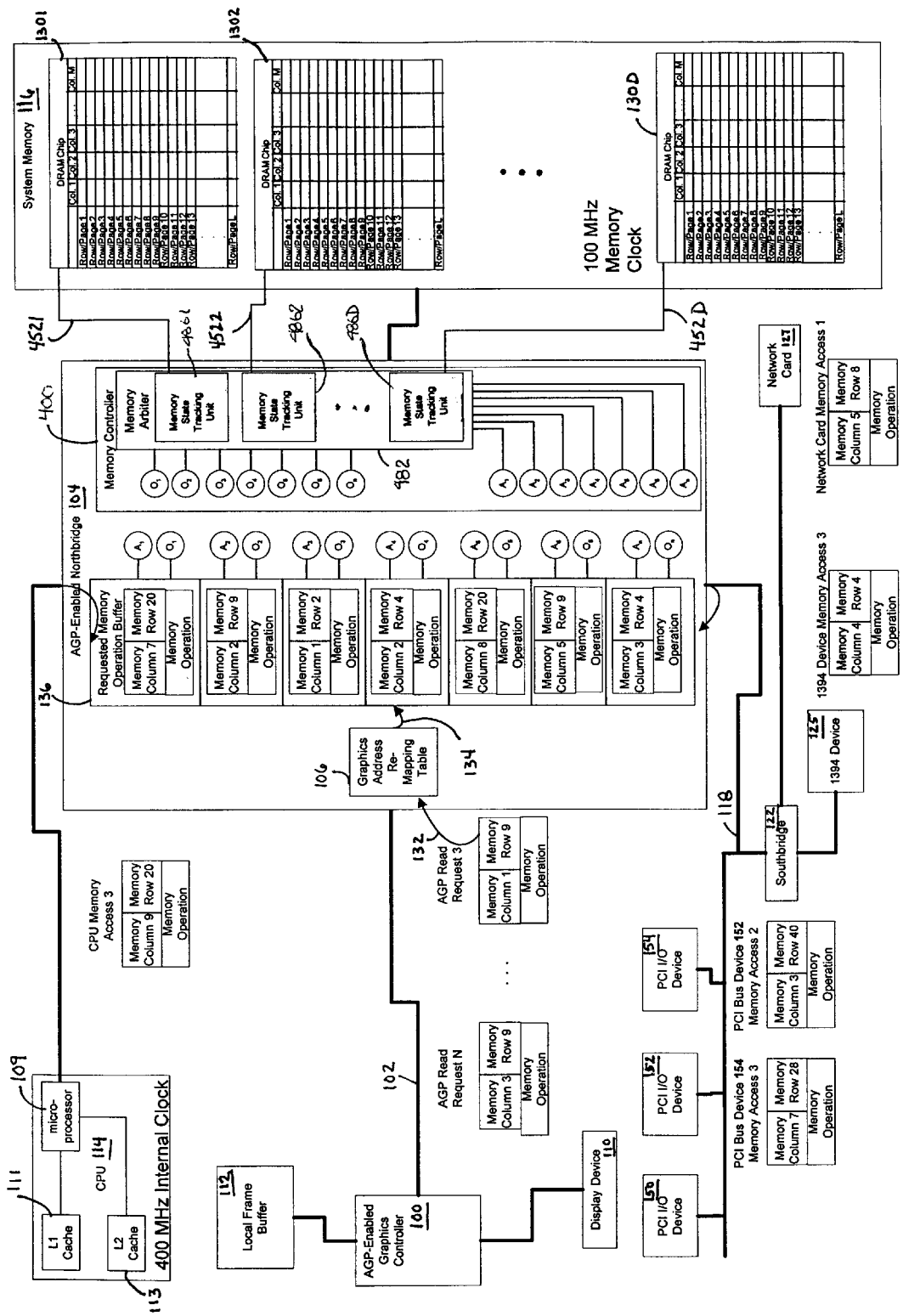
FIG. 6 illustrates a high-level pictographic representation of an embodiment of the present invention.

With reference now to FIG. 6, illustrated is a high level pictographic representation of an embodiment of the present invention. The embodiment depicted in FIG. 6 is somewhat of a combination of the embodiments of FIGS. 4 and 5. Specifically, shown is that memory arbiter 482 has contained within it memory state tracking units 486I–486D. Each memory state tracking unit 486I–486D is respectively associated with a DRAM chip 130I–130D in system memory 116. Further shown is that each memory state tracking unit 486I–486D receives memory status information regarding its associated DRAM chip 130I–130D via memory status line 452I–452D.

Each memory state tracking unit 486I–486D receives, independently of all other memory state tracking units 486I–486D, the signals present on memory address lines $A_1$–$A_n$ and the information on memory operation lines $O_1$–$O_n$. Consequently, each memory state tracking unit 486I–486D functions essentially autonomously from other memory state tracking units 486I–486D in essentially the fashion described for memory state tracking unit 484 in FIG. 4. Not shown, but intended to be understood is that each memory state tracking unit 486I–486D is intended to communicate with every other memory state 1-tracking unit 486I–486D 486D such that the memory state tracking units 486I–486D do not retrieve and duplicate memory operations pending in requested memory operation buffer 136 amongst themselves.

Figure 7:
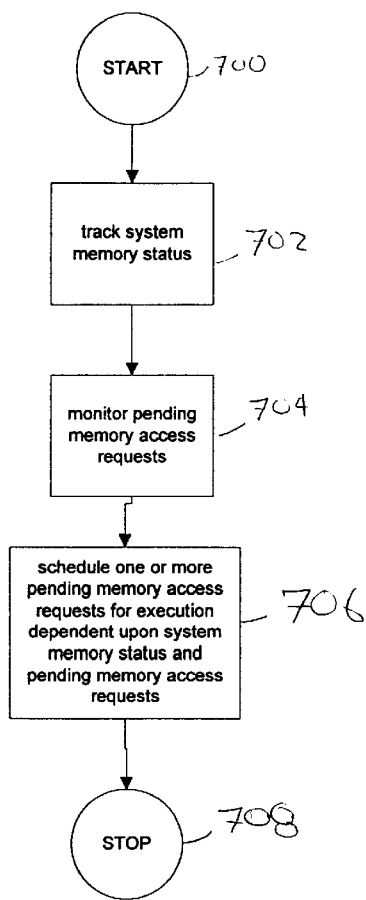
FIG. 7 depicts a high-level logic flowchart of one embodiment of the present invention.

Referring now to FIG. 7, depicted is a high-level logic flowchart of one embodiment of the present invention. Method step 700 illustrates the start of the process. Method step 702 shows the step of memory arbiter 482 tracking system memory 116 status. Method step 704 depicts the step of memory arbiter 482 monitoring pending memory access requests, such as those pending memory access requests depicted in requested memory operation buffer 136. Method step 706 illustrates the step of memory arbiter 482 scheduling one or more one or more pending memory access requests for execution dependent upon the system memory status and the pending memory access requests. Method step 708 depicts the end of the process.

Figure 8:
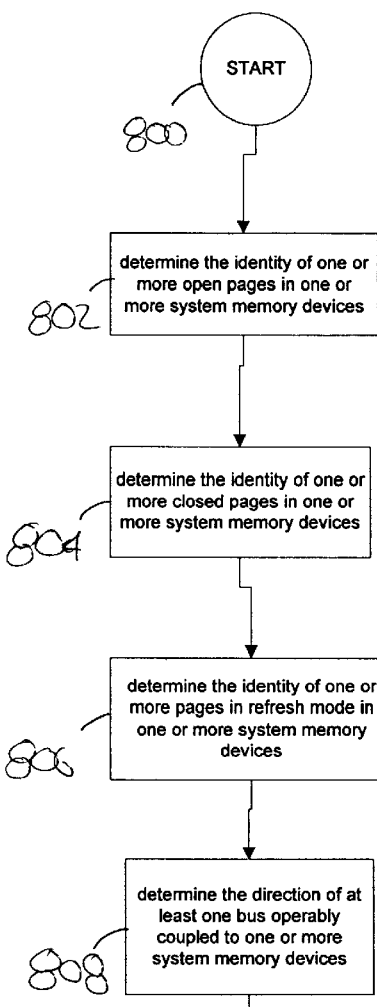
FIG. 8 illustrates a high-level logic flowchart depicting one embodiment of a process by which a memory arbiter monitors system memory status.

With reference now to FIG. 8, illustrated is a high-level logic flowchart depicting one embodiment of a process by which memory arbiter 482 monitors system memory status. Method step 800 shows the start of the process. Method step 802 depicts the step of memory arbiter 482 determining the identity of one or more open pages in one or more system memory devices, such as DRAM chips 130I–130D or banks of system memory. Method step 804 illustrates the step of memory arbiter 482 determining the identity of one or more closed pages in one or more system memory devices, such as DRAM chips 130I–130D or banks of system memory. Method step 806 depicts the step of memory arbiter 482 determining the identity of one or more pages in refresh mode in one or more system memory devices, such as DRAM chips 130I–130D or banks of system memory. Method step 808 illustrates determining the direction the of at least one bus operably coupled to one or more system memory devices, such as DRAM chips 130I–130D or banks of system memory. Method step 810 shows the end of the process.

Figure 9:
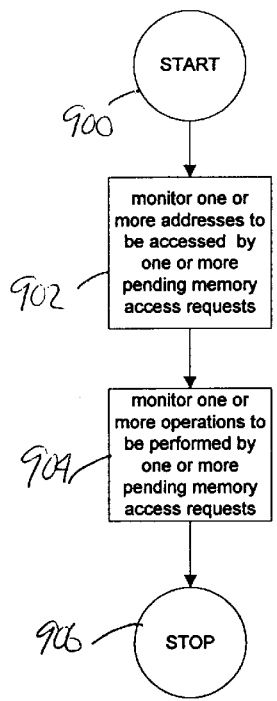
FIG. 9 shows a high-level logic flowchart depicting one embodiment of a process by which a memory arbiter monitors pending memory access requests.

Referring now to FIG. 9, shown is a high-level logic flowchart depicting one embodiment of a process by which memory arbiter 482 monitors pending memory access requests. Method step 900 shows the start of the process. Method step 902 depicts the step of memory arbiter 482 monitoring one or more addresses to be accessed by one or more pending memory access requests, such as those shown in requested memory operation buffer 136. Method step 904 illustrates the step of memory arbiter 482 monitoring one or more operations to be performed by one or more pending memory access requests, such as those shown in requested memory operation buffer 136. Method step 906 shows the end of the process.

Figure 10:
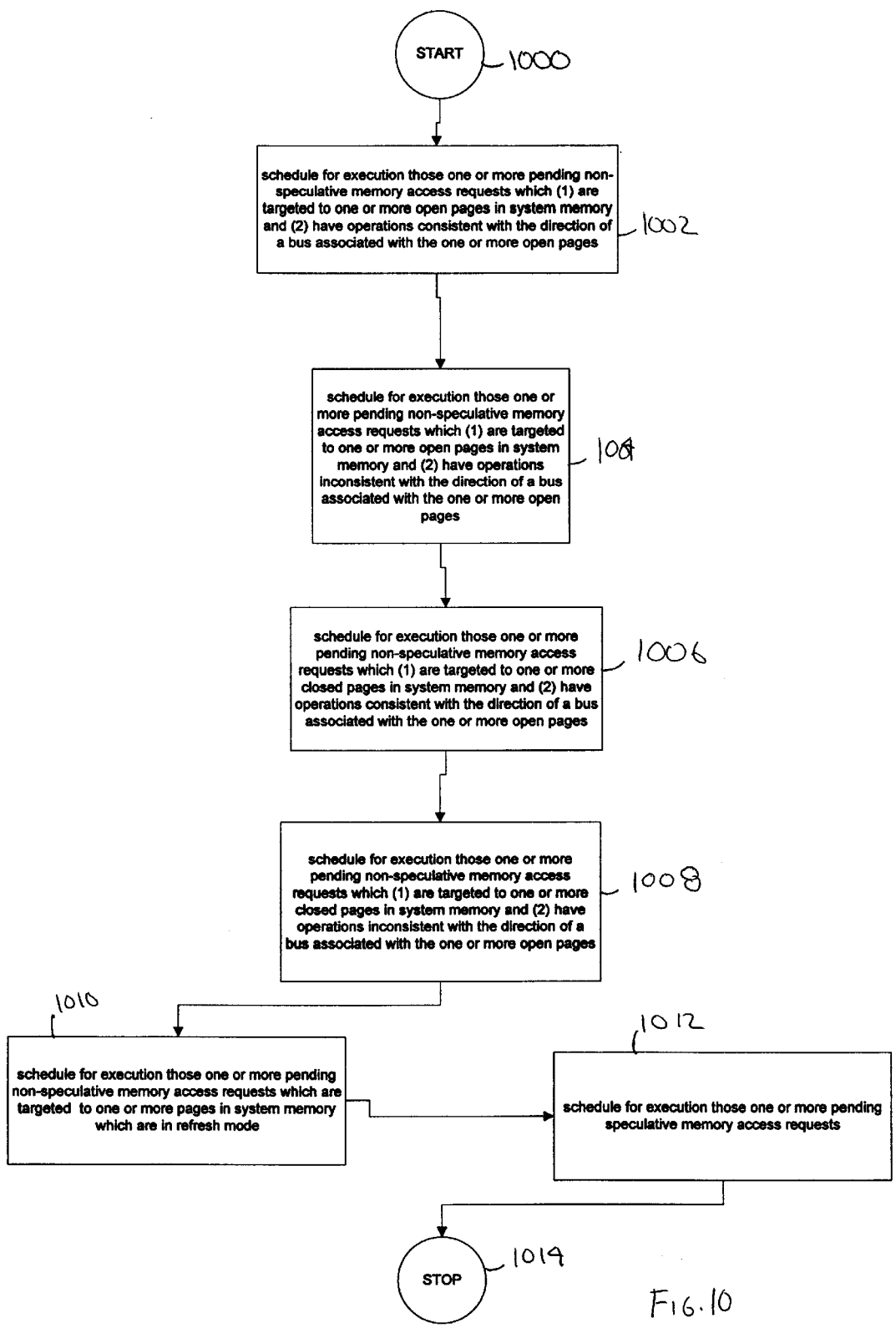
FIG. 10 shows a high-level logic flowchart depicting one embodiment of a process by which a memory arbiter schedules one or more pending memory access requests for execution, in a hierarchical fashion, in response to system memory status and pending memory access requests.

With reference now to FIG. 10, shown is a high-level logic flowchart depicting one embodiment of a process by which memory arbiter 482 schedules one or more pending non-speculative memory access requests for execution, in a hierarchical fashion, in response to system memory status and pending non-speculative memory access requests. Method step 1000 shows the start of the process. Method step 1002 depicts the step of memory arbiter 482 scheduling for execution those one or more pending non-speculative memory access requests which (1) are targeted to one or more open pages in system memory and (2) have operations consistent with the direction of a bus associated with the one or more open pages. Method step 1004 illustrates the step of memory arbiter 482 scheduling for execution those one or more pending non-speculative memory access requests which (1) are targeted to one or more open pages in system memory and (2) have operations inconsistent with the direction of a bus associated with the one or more open pages. Method step 1006 shows the step of memory arbiter 482 scheduling for execution those one or more pending non-speculative memory access requests which (1) are targeted to one or more closed pages in system memory and (2) have operations consistent with the direction of a bus associated with the one or more open pages. Method step 1008 depicts the step of memory arbiter 482 scheduling for execution those one or more pending non-speculative memory access requests which (1) are targeted to one or more closed pages in system memory and (2) have operations inconsistent with the direction of a bus associated with the one or more open pages. Method step 1010 illustrates the step of memory arbiter 482 scheduling for execution those one or more pending non-speculative memory access requests which are targeted to one or more pages in system memory which are in refresh mode. Method step 1012 shows the step of memory arbiter 482 scheduling for execution those one or more pending speculative memory access requests. Method step 1014 depicts the end of the process. Other embodiments for hierarchical reordering within the spirit of the foregoing described scheduling process also exist, such as reordering of the foregoing described process or a subset thereof, or the foregoing process analogously reengaged in for scheduling the speculative requests.

The foregoing detailed description has set forth various embodiments of the present invention via the use of block diagrams, pictographic representations, flowcharts and examples. It will be understood as notorious by those within the art that each component, step, and operation illustrated by the use of block diagrams, pictographic representations, and examples can be implemented, individually and/or collectively, by a wide range of hardware, software, firmware, or any combination thereof. In one embodiment, the present invention is implemented via Application Specific Integrated Circuits (ASICs). However, those skilled in the art will recognize that the embodiments disclosed herein, in whole or in part, can be equivalently aimplemented in standard Integrated Circuits, as a computer program running on a computer or processor, as firmware, or as virtually any combination thereof and that designing the circuitry and/or writing the code for the software or firmware would be well within the skill of one of ordinary skill in the art in light of this specification

OTHER EMBODIMENTS

Several various embodiments have been described above, and it will be obvious to those skilled in the art that, based upon the teachings herein, changes and modifications may be made without departing from this invention and its broader aspects. The fact that some examples in the foregoing description have been specifically designated as non-limiting has been done for emphasis, and should not be construed to interpret any other examples as limiting. That is, all examples set forth herein are intended to be exemplary and non-limiting.

For example, although the foregoing embodiments have been described via the use of "page-state" terms, it is to be understood that the term "page-state" is exemplary. It will be understood by those within the art that as used herein the term "page-state" is a specific instance of a way in which the availability of memory storage can be tracked, and it is intended that such term be understood to equate to all substantially equivalent memory device storage state referents which are used to demarcate the state of various aspects of system memory, such as "bank state".

For example, while the foregoing described embodiments have been described in the context of a single processor for the sake of clarity, it will be understood by those within the art that the present invention could be used in multiple processor environments. Also, while the foregoing described embodiments have been described in the context of a single memory bus for the sake of clarity, it will be understood by those within the art that the present invention could be used in multiple memory bus environments. Accordingly, the described architectures are not intended to be limiting.

For example, it was mentioned in relation to the foregoing described embodiments that the memory status lines need not equate to physically connected devices; that is, it was explained that embodiments exist whereby operable connection is achieved and memory status obtained by system components (e.g., memory arbiters, memory state tracking units, or memory controllers) tracking past memory access activities and inferring the status of one or more memory devices from that past activity. Likewise, embodiments exist whereby other of the above-described connections can be achieved by analogous logical associations such that the desired functionality of the above-described connections can be achieved, and such alternate embodiments are intended to be covered by such connectivity of the above-set-forth embodiments; that is, it is to be understood that any reference to connection between components, as used herein, is intended to be representative of both the physical and logical connections. Accordingly, the described architectures are not intended to be limiting.

Also for example, while the embodiments have been described in the context of the AGP interface standard, it will be recognized that the embodiments herein can be applied to other similar problems which exist in other non-AGP interface standard systems wherein similar problems analogous to those solved by the present invention exist. For example, data processing systems wherein the AGP interface standard is not utilized, such as standard PCI and ISA systems. Thus, the specific protocols described are not intended to be limiting.

The foregoing described embodiments wherein the different components are contained within different other components (e.g., the memory state tracking units contained within the memory arbiters). It is to be understood that such depicted architectures are merely exemplary, and that in fact many other architectures can be implemented which achieve the same functionality. In an abstract, but still definite sense, any arrangement of components to achieve the same finctionality is effectively "associated" such that the desired functionality is achieved. Hence, any two components herein combined to achieve a particular functionality can be seen as "associated with" each other such that the desired functionally is achieved, irrespective of architectures or intermedial. Likewise, any two components so associated can also be viewed as being "operably connected", or "operably coupled", to each other to achieve the desired functionally.

Other embodiments are within the following claims.

It is to be understood that although in the foregoing described embodiments the address and operations pending within requested memory operation buffer are shown separately, such could also be conveyed within the same signal and that such signals need not be separate. It will be understood by those within the art that such signals were shown separately such that the clarity and presentation of the invention could be preserved.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles.

What is claimed is:

1. A system, comprising:
   a memory controller comprising:
      a memory arbiter configured to arbitrate between memory requests received by the memory controller according to both a memory page status and a current bus direction of a bus for accessing a memory, wherein the memory arbiter is configured to re-order a memory request directed to a currently open memory page and consistent with the current bus direction ahead of a memory request directed to a currently closed memory page or inconsistent with the current bus direction.

2. The system of claim 1, further comprising:
   one or more memory state tracking units operably coupled to said page-state sensitive memory arbiter; and
   said one or more memory state tracking units operably coupled to a system memory.

3. The system of claim 2, wherein said one or more memory state tracking units operably coupled to a system memory further include:
   said one or more memory state tracking units operably coupled to one or more system memory devices.

4. The system of claim 3, wherein said one or more memory state tracking units operably coupled to one or more system memory devices further include:
   said one or more memory state tracking units operably coupled to one or more DRAM chips.

5. The system of claim 3, wherein said one or more memory state tracking units operably coupled to one or more system memory devices further include:
   said one or more memory state tracking units operably coupled to one or more one or more banks of memory.

6. The system of claim 3, wherein said one or more memory state tracking units operably coupled to one or more system memory devices further include:
   at least one of said one or more memory state tracking units operably coupled to at least one of the one or more system memory devices.

7. The system of claim 6, wherein said at least one of said one or more memory state tracking units operably coupled to at least one of the one or more system memory devices further includes:
   said at least one of said one or more memory state tracking units operably coupled to a plurality of said one or more system memory devices.

8. The system of claim 6, wherein said at least one of said one or more memory state tracking units operably coupled to at least one of the one or more system memory devices further includes:
   an individual one of said one or more memory state tracking units operably coupled to a correspondent individual one of said one or more system memory devices whereby said individual one of said one or more memory state tracking units is respectively associated with the corresponding individual one of said one or more system memory devices.

9. The system of claim 1, further comprising:
   at least one requested memory operation buffer; and
   said at least one requested memory operation buffer operably coupled to said page-state sensitive memory arbiter.

10. The system of claim 9, wherein said at least one requested memory operation buffer operably coupled to said page-state sensitive memory arbiter further includes:
    one or more memory address lines operably coupling said at least one requested memory operation buffer to said page-state sensitive memory arbiter.

11. The system of claim 9, wherein said at least one requested memory operation buffer operably coupled to said page-state sensitive memory arbiter further includes:
    one or more memory operation lines operably coupling said at least one requested memory operation buffer to said page-state sensitive memory arbiter.

12. The system of claim 1, wherein said system further comprises:
    a processing unit;
    a first bridge;
    a system memory;
    a graphics bus; and
    an input-output bus.

13. The system of claim 12, further comprising:
    a graphics controller;
    a local frame buffer;
    a display device; and
    an input-output bridge.

14. A method, comprising:
    tracking system memory status including which one or more memory pages are currently open;
    monitoring pending memory access requests; and
    scheduling the pending memory access requests for execution dependent upon the system memory status and memory bus direction, wherein said scheduling comprises scheduling one or more of the pending memory access requests directed to a currently open memory page and consistent with a current memory bus direction ahead of one or more pending memory access requests directed to a currently closed memory page or inconsistent with the current memory bus direction.

15. The method of claim 14, wherein said tracking system memory status further includes:
    determining the status of one or more system memory devices.

16. The method of claim 15, wherein said determining the status of one or more system memory devices further includes:
    determining the identity of one or more open pages in the one or more system memory devices.

17. The method of claim 15, wherein said determining the status of one or more system memory devices further includes:
    determining the identity of one or more closed pages in the one or more system memory devices.

18. The method of claim 15, wherein said determining the status of one or more system memory devices further includes:
    determining the identity of one or more pages in refresh mode in the one or more system memory devices.

19. The method of claim 15, wherein said determining the status of one or more system memory devices further includes:
    determining the direction of at least one bus operably coupled to the one or more system memory devices.

20. The method of claim 14, wherein said monitoring pending memory access requests further includes:
    monitoring one or more addresses to be accessed by one or more pending memory access requests.

21. The method of claim 20, wherein said monitoring one or more addresses to be accessed by one or more pending memory access requests further includes:

monitoring one or more operations to be performed by one or more pending memory access requests.

22. The method of claim 14, wherein said scheduling one or more pending memory access requests for execution dependent upon the system memory status and the pending memory access requests further includes:
scheduling for execution those one or more pending memory access requests which (1) are targeted to one or more open pages in system memory and (2) have operations consistent with a direction of at least one bus associated with the one or more open pages.

23. The method of claim 14, wherein said scheduling one or more pending memory access requests for execution dependent upon the system memory status and the pending memory access requests further includes:
scheduling for execution those one or more pending memory access requests which (1) are targeted to one or more open pages in system memory and (2) have operations inconsistent with a direction of at least one bus associated with the one or more open pages.

24. The method of claim 14, wherein said scheduling one or more pending memory access requests for execution dependent upon the system memory status and the pending memory access requests further includes:
scheduling for execution those one or more pending memory access requests which (1) are targeted to one or more closed pages in system memory and (2) have operations consistent with a direction of at least one bus associated with the one or more open pages.

25. The method of claim 14, wherein said scheduling one or more pending memory access requests for execution dependent upon the system memory status and the pending memory access requests further includes:
scheduling for execution those one or more pending memory access requests which (1) are targeted to one or more closed pages in system memory and (2) have operations inconsistent with a direction of at least one bus associated with the one or more open pages.

26. The method of claim 14, wherein said scheduling one or more pending memory access requests for execution dependent upon the system memory status and the pending memory access requests further includes:
scheduling for execution those one or more pending memory access requests which are targeted to one or more pages in system memory which are in refresh mode.

27. A system, comprising:
means for tracking system memory status including which one or more memory pages are currently open;
means for monitoring pending memory access requests; and
means for scheduling the pending memory access requests for execution dependent upon the system memory status and memory bus direction, wherein said means for scheduling comprises means for scheduling one or more of the pending memory access requests directed to a currently open memory page and consistent with a current memory bus direction ahead of one or more pending memory access requests directed to a currently closed memory page or inconsistent with the current memory bus direction.

28. The system of claim 27, wherein said means for tracking system memory status further includes:
means for determining the status of one or more system memory devices.

29. The system of claim 28, wherein said means for determining the status of one or more system memory devices further includes:
means for determining the identity of one or more open pages in the one or more system memory devices.

30. The system of claim 28, wherein said means for determining the status of one or more system memory devices further includes:
means for determining the identity of one or more closed pages in the one or more system memory devices.

31. The system of claim 28, wherein said means for determining the status of one or more system memory devices further includes:
means for determining the identity of one or more pages in refresh mode in the one or more system memory devices.

32. The system of claim 28, wherein said means for determining the status of one or more system memory devices further includes:
means for determining the direction the of at least one bus operably coupled to the one or more system memory devices.

33. The system of claim 27, wherein said means for monitoring pending memory access requests further includes:
means for monitoring one or more addresses to be accessed by one or more pending memory access requests.

34. The system of claim 33, wherein said means for monitoring one or more addresses to be accessed by one or more pending memory access requests further includes:
means for monitoring one or more operations to be performed by one or more pending memory access requests.

35. The system of claim 27, wherein said means for scheduling one or more pending memory access requests for execution dependent upon the system memory status and the pending memory access requests further includes:
means for scheduling for execution those one or more pending memory access requests which (1) are targeted to one or more open pages in system memory and (2) have operations consistent with a direction of at least one bus associated with the one or more open pages.

36. The system of claim 27, wherein said means for scheduling one or more pending memory access requests for execution dependent upon the system memory status and the pending memory access requests further includes:
means for scheduling for execution those one or more pending memory access requests which (1) are targeted to one or more open pages in system memory and (2) have operations inconsistent with a direction of at least one bus associated with the one or more open pages.

37. The system of claim 27, wherein said means for scheduling one or more pending memory access requests for execution dependent upon the system memory status and the pending memory access requests further includes:
means for scheduling for execution those one or more pending memory access requests which (1) are targeted to one or more closed pages in system memory and (2) have operations consistent with a direction of at least one bus associated with the one or more open pages.

38. The system of claim 27, wherein said means for scheduling one or more pending memory access requests for execution dependent upon the system memory status and the pending memory access requests further includes:
means for scheduling for execution those one or more pending memory access requests which (1) are targeted to one or more closed pages in system memory and (2) have operations inconsistent with a direction of at least one bus associated with the one or more open pages.

39. The system of claim 27, wherein said means for scheduling one or more pending memory access requests for execution dependent upon the system memory status and the pending memory access requests further includes:
  means for scheduling for execution those one or more pending memory access requests which are targeted to one or more pages in system memory which are in refresh mode.

40. The system of claim 27, wherein said system further comprises:
  a processing unit;
  a first bridge;
  a system memory;
  a graphics bus; and
  an input-output bus.

41. The system of claim 40, further comprising:
  a graphics controller;
  a local frame buffer;
  a display device; and
  an input-output bridge.

* * * * *